Figure 7:
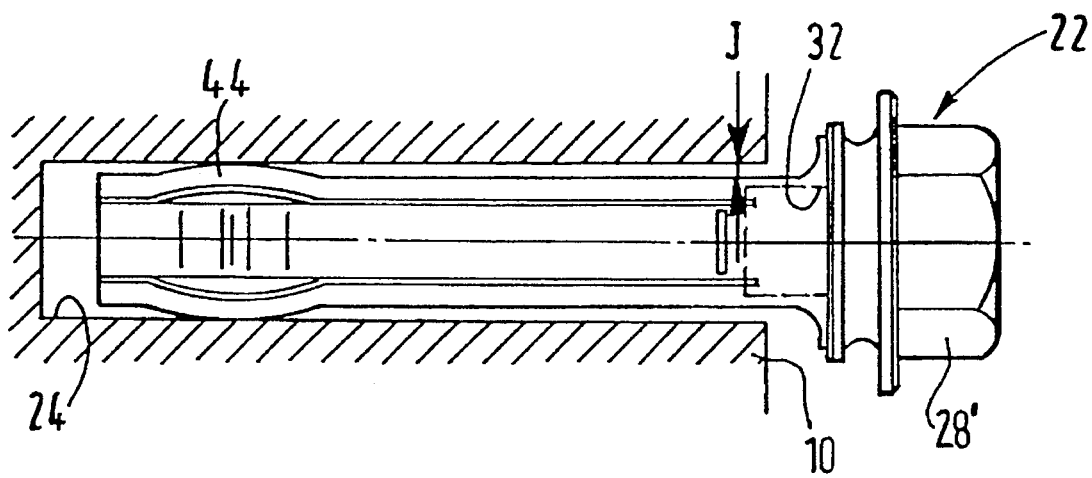

United States Patent

Tribuzio et al.

[11] Patent Number: 5,562,187
[45] Date of Patent: Oct. 8, 1996

[54] GUIDE PIN FOR A SLIDING CALIPER DISC BRAKE

[75] Inventors: Pasquale Tribuzio, Bitonto; Angelantonio Errico, Giovinazzo, both of Italy

[73] Assignee: AlliedSignal Freni SPA, Modungo, Italy

[21] Appl. No.: 325,198

[22] PCT Filed: Sep. 28, 1994

[86] PCT No.: PCT/EP94/03240

§ 371 Date: Oct. 10, 1994

§ 102(e) Date: Oct. 10, 1994

[87] PCT Pub. No.: WO95/10712

PCT Pub. Date: Apr. 20, 1995

[30] Foreign Application Priority Data

Oct. 14, 1993 [IT] Italy .................. TO93A0750

[51] Int. Cl.⁶ .................. F16D 55/227
[52] U.S. Cl. .................. 188/73.45; 188/73.35
[58] Field of Search .................. 188/73.44, 73.45, 188/72.3, 71.8, 71.9, 71.7, 216, 73.35, 73.36, 73.43, 205 A, 206 A; 74/18.2

[56] References Cited

U.S. PATENT DOCUMENTS

| Re. 30,255 | 4/1980 | Bath et al. . | |
|---|---|---|---|
| 3,616,876 | 11/1971 | Brooks | 188/73.45 |
| 3,625,314 | 12/1971 | Rinker | 188/73.35 |
| 3,648,807 | 3/1972 | Lottridge et al. | 188/73.35 |
| 4,074,795 | 2/1978 | Kondo et al. | 188/73.45 |
| 4,084,665 | 4/1978 | Burnett | 188/73.45 |
| 4,265,340 | 5/1981 | Scott et al. | 188/73.44 |
| 4,393,963 | 7/1983 | Oltmanns, Jr. et al. | 188/73.35 |
| 4,574,922 | 3/1986 | Varin et al. . | |
| 4,596,318 | 6/1986 | Bidol | 188/73.45 |

FOREIGN PATENT DOCUMENTS

| 0511581 | 4/1992 | European Pat. Off. . |
| 2117636 | 7/1972 | France . |
| 2544370 | 4/1977 | Germany . |
| 3635828 | 5/1988 | Germany . |
| 3721718 | 1/1989 | Germany . |
| 3825101 | 1/1990 | Germany . |

OTHER PUBLICATIONS

Patent Abstracts of Japan, vol. 4, No. 23 (M-093) 26 Feb. 1980 & JP-A-54160971 (Toyota) 20 Dec. 1979.

*Primary Examiner*—Douglas C. Butler
*Attorney, Agent, or Firm*—Leo H. McCormick, Jr.

[57] ABSTRACT

A disc brake having a caliper slidingly mounted on a fixed support and including two friction pads received with anchorage and sliding in the fixed support. The two friction pads frictionally engage opposite faces of a rotating disc in response to actuation of a brake motor carried by the caliper. The caliper slides with respect to the fixed support on at least one axial guide pin. The guide pin including a first part secured to the caliper or to the fixed support, and a second part received with and sliding in a corresponding bore of the fixed support or caliper, respectively. An elastic member is located between the axial guide pin and corresponding bore in which it slides. The second part of the guide pin consists of a tube made of an elastic material which has slits that extend through its thickness of the tube and over at least part of its length. The slits which are uniformly distributed along the periphery of the tube form equidistant thin strips having an equal width. Each of the thin strips exhibiting, over its length, at least one corrugation of which a convexity points towards the outside of the guide pin. The tube has a radius at the crest of the corrugation which is greater than or at least equal to the radius of the bore when the brake motor is in a rest position.

8 Claims, 3 Drawing Sheets

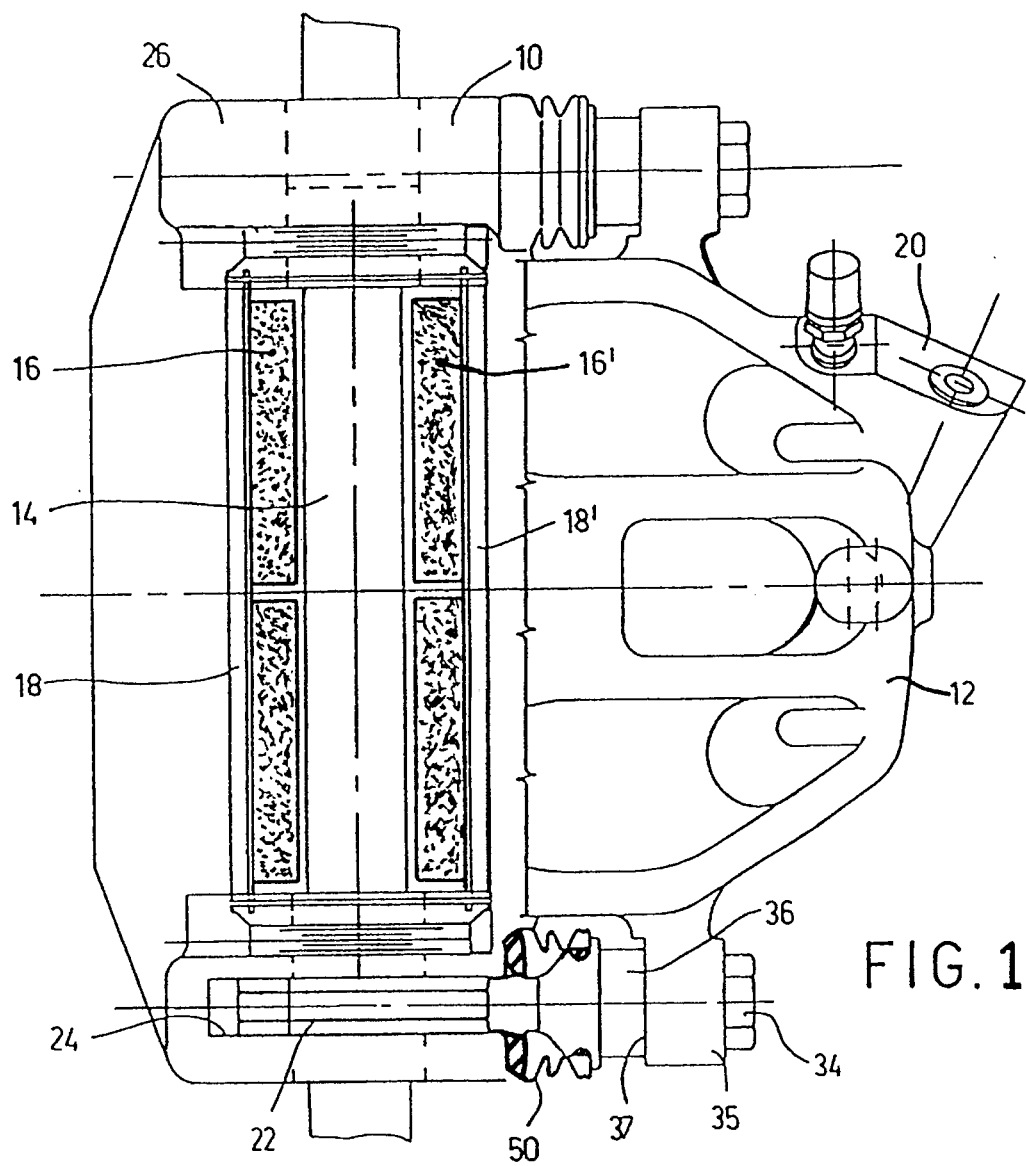
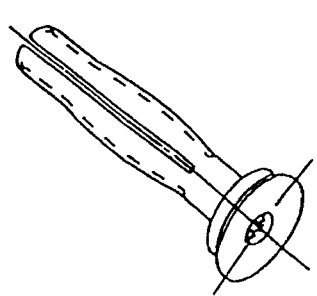
FIG. 2A
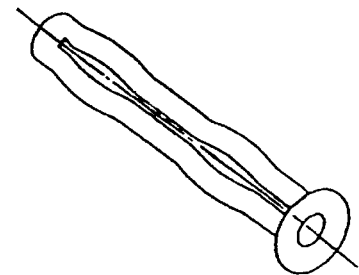
FIG. 4A
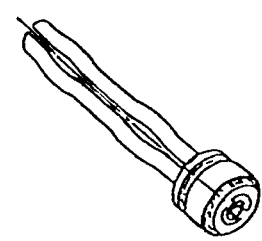
FIG. 5A

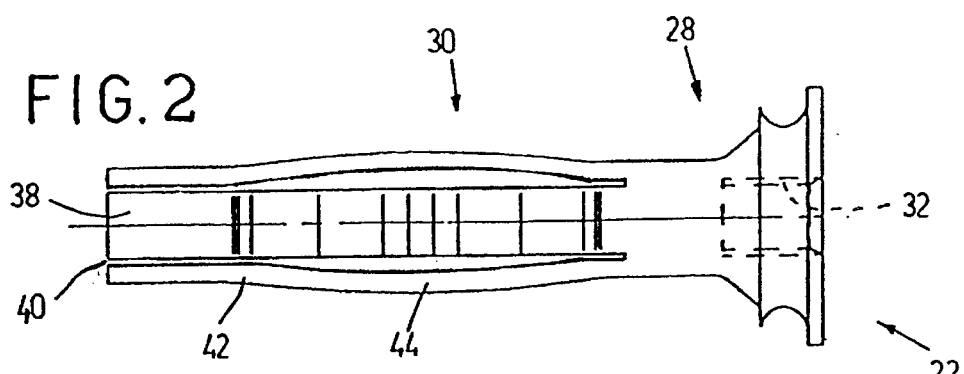
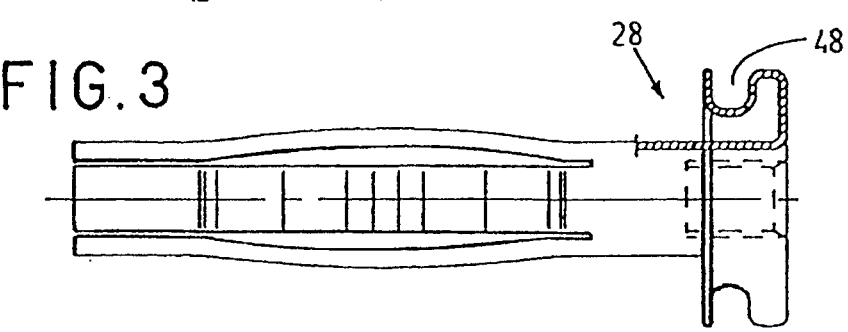
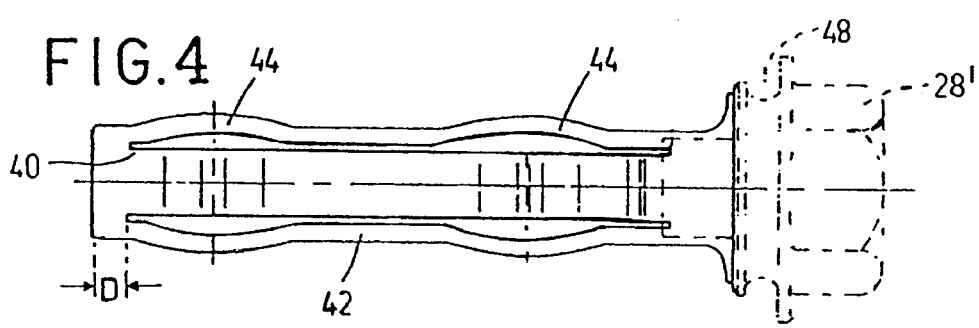
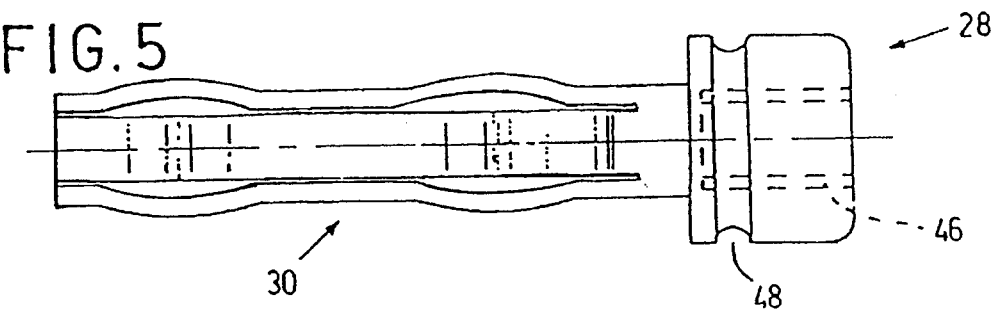
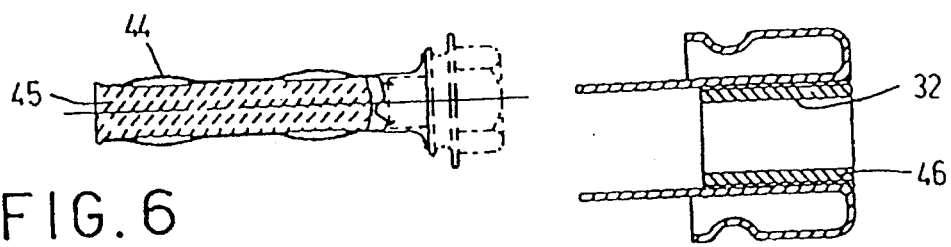

GUIDE PIN FOR A SLIDING CALIPER DISC BRAKE

The present invention relates to sliding caliper disc brakes which are intended in particular to equip motor vehicles.

The invention relates more particularly to a disc brake with a caliper slidingly mounted on a fixed support and including two friction pads received with anchorage and sliding in the fixed support, and capable of coming into frictional engagement with the opposite faces of a rotating disc when a brake motor carried by the caliper is actuated, the caliper sliding with respect to the fixed support by means of at least one axial guide pin, including a first part secured to the caliper or to the fixed support, and a second part received with sliding in a corresponding bore of the fixed support or of the caliper respectively, elastic means being disposed between the axial guide pin and the bore in which it slides.

In disc brakes of this type, the sliding mounting on the fixed support poses numerous problems which attempts have been made to solve in different ways.

For example, a rubber sleeve has already been arranged between the guide pin and the bore in which it slides, to urge the caliper to its initial position after a braking action, as in U.S. Pat. Nos. 4,334,598 or 4,436,186. On the other hand, U.S. Pat. No. 4,061,209 or GB-A-1,573,305 makes known a disc brake in which one of the bores receiving one of the guide pins is radially oversized and in which the guide pin is pressed into an eccentric position in contact with the wall of the bore by the spring normally arranged between the caliper and the friction lining, to prevent the guide pin from undergoing stresses during braking.

US-E-30 255 also makes known a disc brake of the above mentioned type, in which is disposed, between the guide pin and the bore in which it slides, an elastic bushing for urging the caliper into its initial position after a brake actuation.

However, such a construction requires the guide pin to be strictly coaxial with the bore which receives it, otherwise the sliding guidance of the caliper on the fixed support has provided only imperfectly, and vibrations of the caliper result during braking actions, which can generate significant noises and even damage or destroy the guide pin by premature wear.

The subject of the invention is therefore a disc brake of the type described above, in which the sliding of the caliper on the fixed support is provided even in the case of a parallelism defect between the guide pin and the bore which receives it, or in the case of a difference between the offsets on the one hand of the axes of the bores in the fixed support and, on the other hand, of the axes of guide pins and which allows a rotational movement of the caliper with respect to the fixed support during a braking action, without impeding the sliding of the caliper.

To this end, the invention is essentially characterized in that the second part of the guide pin consists of a tube made of an elastic material, slits being made in the thickness of the tube and, over at least part of its length, the slits being uniformly distributed along the periphery of the tube in order to form equidistant thin strips of equal width, each thin strip exhibiting, over its length, at least one corrugation of which the convexity points towards the outside of the guide pin, the radius at the crest of the corrugation at rest being greater than, or equal to, the radius of the bore.

In that way, this guide pin part will be capable of taking account both of parallelism defects between it and the bore which receives it, and of the movements of the caliper brought about by the braking torque, without impeding the sliding of the caliper.

Figure 8:
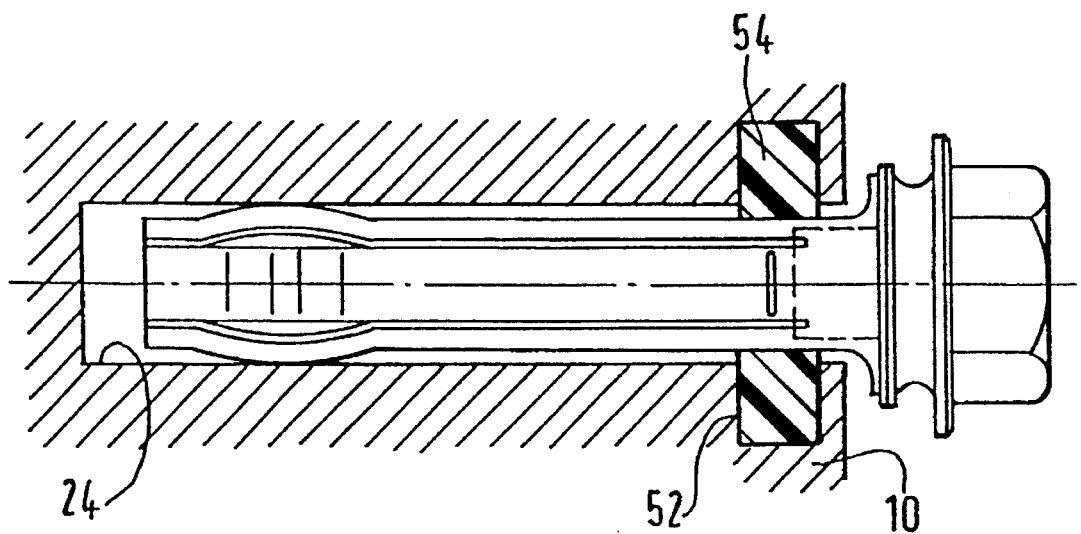

Other objects, characteristics and advantages of the invention will emerge from the description which follows of one embodiment given by way of example with reference to the appended drawings in which:

FIG. 1 is a plan view in partial section of a disc brake produced in accordance with the invention, FIG. 2 is an enlarged view of the guide pin equipping the disc brake of FIG. 1, FIG. 2A is a perspective view of the guide pin of FIG. 2, FIG. 3 is a view of a variant of the guide pin of FIG. 2, FIG. 4 is a view of a second variant of the guide pin of FIG. 2, FIG. 4A is a perspective view of the guide pin of FIG. 4, FIG. 5 is a view of another variant of the guide pin of FIG. 2, FIG. 5A is a perspective view of the guide pin of FIG. 5, FIG. 5B is a sectional view of one end of the guide pin of FIG. 5, FIG. 6 is a sectional view of a variant of the guide pin of FIG. 4, FIG. 7 is a sectional view on a larger scale of the guide pin equipping the disc brake of FIG. 1, and FIG. 8 is a view, similar to that of FIG. 7, of an alternative mounting of a guide pin according to the present invention.

In the various figures, the same elements are given the same reference symbols.

Referring first of all to FIG. 1, it is seen that the disc brake represented in the figure includes a fixed support 10 which is intended to be associated with a fixed part of the vehicle (which part is not represented). The fixed support 10 receives, with sliding, a caliper 12 straddling a disc 14 intended to be associated, in terms of rotation, with a vehicle wheel (not represented).

The disc brake moreover includes two friction members 16, 16' equipped respectively with carrier plates 18, 18' capable of coming into frictional engagement with the rotating disc 14 when a brake motor 20 carried by the caliper 12 is actuated. The friction members are received with anchorage and sliding on the fixed support 10.

The caliper 12 slides on the fixed support 10 by means of two axial guide pins 22 whose axis is parallel to that of the disc 14. The guide pins 22 are secured to the caliper 12 and are received with sliding in corresponding bores 24 formed in arms 26 of the fixed support 10.

More precisely, as is best seen in FIGS. 2 to 5A, each guide pin includes a first part 28 intended to secure the guide pin to the caliper 12, and a second part 30, intended to penetrate into the bore 24 of the fixed support 10.

In the embodiment of FIG. 2, the first part 28 is formed integrally with the second part 30 of the guide pin. The first part 28 is solid and includes a tapped bore 32 to allow the guide pin 22 to be secured to the caliper, for example by means of a screw 34 (FIG. 1) passing through an opening made in one arm 35 of the caliper, and possibly a spacer 36.

The second part 30 of the guide pin consists of a tube made from an elastic material, such as stainless or work-hardened spring steel for example.

In order to increase the elasticity of the part 30, radial slits 40 may advantageously be made in the thickness of the tube 38, and evenly distributed along the periphery of the tube 38. In the example represented, four slits have been used, but two, three, five or more could equally well have been used, depending on the stiffness which it is desired to give the part 30.

The slits 40 made in the tube 38 divide it into so many axial thin strips 42 which are equidistant and of equal width in the circumferential direction.

Advantageously also, corrugations 44 may be formed on each thin strip 42, the convexity of which corrugations points radially towards the outside of the guide pin.

In FIGS. 2 and 3, each thin strip includes only one corrugation, whereas in FIGS. 4 and 5, the thin strips each include two corrugations. These embodiments may of course be combined and, as in the example represented with four thin strips, use may be made of two thin strips with one corrugation interposed between two thin strips with two corrugations. A number of corrugations greater than two may equally be envisaged.

In order for the guide pin 22 to fulfil its function of guiding the caliper in sliding on the fixed support 10, the radius at the crest of each corrugation 44 is at rest, that is to say when the guide pin is not inserted in the bore 24, at least equal to the radius of the bore 24, and preferably slightly greater so as to hold the caliper without hindering its sliding.

It is understood from the foregoing explanations that the guide pin which has just been described makes it possible to achieve the objectives of the invention. Indeed, when assembling the disc brake, whether this be initial assembly, or refitting the brake after an operation such as a change of the friction linings, the guide pins 22 are firstly placed in the bores 24, as best seen in FIG. 7.

The example represented in FIG. 7 corresponds to the guide pin of FIG. 4 in which one of the corrugations 44 has been omitted, and the guide pin of FIG. 2 where the corrugation 44 is offset towards the end of the tube 38, but these guide pins could equally well have been represented as they are, or those of FIGS. 3 or 5 could have been represented.

In FIG. 7 it can be seen that, in this position, the corrugation 44 is compressed radially in the bore 24, which perfectly centres the guide pin 22 in the bore, and which also allows a diametral clearance J to be left between the bore 24 and the cylindrical part or parts of the guide pin 22 which do not have corrugations.

It is then possible to fit the caliper 12 onto the fixed support 10 by inserting the screws 34 into the openings in the arms 35 and screwing them into the bores 32.

It is thus seen that the elasticity of the material constituting the guide pins, mainly in the radial direction, makes it possible to take account of manufacturing tolerances of the disc brake, such as the offset of the axes of the bores 24 and of the openings in the arms 35, the parallelism between these axes or the end faces of the spacer 36, or the perpendicularity between the axis of the bore 24 and the face 37 of the arm 35 which acts as a bearing surface for the spacer 36, or for the first part 28 of the guide pin 22.

In addition, during a braking action, the guide pins 22 allow the caliper 12 to slide on the fixed support 10, even if one of these elements undergoes a deformation for example due to intense braking, such a deformation being absorbed by the guide pins. When the braking action ceases, the various elements of the brake can return freely to their rest position by virtue of the elasticity of the guide pins. In that way, all binding effects are avoided, and the efficiency of the braking is thereby improved.

The guide pins which have just been described are capable of receiving numerous modifications. Thus, FIG. 3 represents a guide pin in which the first part 28 is obtained by folding over or crimping one end of the tube constituting the second part 30 of the guide pin 22.

In FIG. 4, it is seen that the guide pin 22 is formed into two parts, the first part 28' being attached to the second part 30 which, in this example, includes thin strips 42 each formed with two corrugations 44. The first part 28' in this example has the shape of a hexagon head nut and is secured to the second part 30 by force fitting, screwing or welding.

The first part 28' may also be formed integrally with the second part 30. Such an embodiment of the first part 28' makes it possible to do away with the spacer 36 and additionally makes it possible to hold the guide pin 22 in terms of rotation while the screw 34 is being screwed in. FIGS. 4 and 4A equally show that the slits 40 are interrupted at a certain distance D from the end of the second part 30 penetrating into the bore 24, to stiffen this end and prevent the thin strips 42 from being moved apart whilst they are being handled.

Such an embodiment of the slits 40 is of course applicable to the embodiments represented in the other figures.

FIGS. 5 and 5A represent an embodiment similar to that of FIG. 3, in which the first part is obtained by folding over or crimping one end of the second part 30, and in which a tubular insert 46 is arranged in the first part 28 to stiffen it and form the bore 32 intended to receive the screw 34. The insert 46 is forcibly fitted, screwed, or welded into the part 28.

Advantageously, an elastic body, such as a rubber cylinder 45, for example, could be arranged inside the tube 38 forming the second part of the guide pin, as represented in FIG. 6, on the one hand, to damp out any possible vibrations of the caliper during the operation of the disc brake and, on the other hand, to limit the inwards radial deformation of the thin strips 42 so that the corrugations 44 retain a permanent contact with the bore 24. Such an elastic body could of course equip the guide pins produced according to the other variants. Likewise, a peripheral groove 48 intended to receive one end of a flexible tubular bellows 50 could be formed on the second part 28, the other end of which bellows is fixed to the fixed support 10 around the bore 24, the bellows 50 serving to prevent the intrusion of dirt into the bore 24.

Advantageously also, in particular for the example of FIG. 7, a groove 52 intended to receive a seal or an elastic ring 54 could be formed in the bore 24 near its end, the seal or elastic ring 54 surrounding the guide pin 24 so as to form an elastic suspension of the guide pin 22 at the entrance of the bore 24, as has been represented in FIG. 8.

Such an elastic suspension in no way alters the characteristics of the guide pin which were described above, or the operation of the disc brake, but it makes it possible to avoid the clearance J being cancelled out under some extreme operating conditions, for example during high-amplitude vibrations resulting from intense braking on a deteriorated road surface.

The elastic ring 54 thus makes it possible to avoid premature wear of the guide pin or of the bore, and contributes to reducing the operating noise of the disc brake. It could quite obviously be used in conjunction with the guide pins represented in FIGS. 2 to 6.

Of course, the invention is not limited to the embodiments described, but can receive numerous modifications which will be apparent to the person skilled in the art. Thus, it would be possible to use on a disc brake just one of the guide pins which have just been described, the other guide pin being conventional, that is to say solid and inelastic. Thus also the invention can be applied to disc brakes in which the guide pins are fixed to the fixed support and received in bores in the caliper.

We claim:

1. A disc brake having a caliper slidingly mounted on a fixed support and including two friction pads received with anchorage and sliding in said fixed support, said two friction pads being capable of coming into frictional engagement with first and second faces on opposite sides of a rotating disc in response to actuation of a brake motor carried by said caliper, said caliper sliding with respect to said fixed support by means of at least one axial guide pin, said guide pin including a first part secured to said caliper or to said fixed support, and a second part received with and sliding in a corresponding first bore of said fixed support or said caliper, respectively, characterized in that said second part of said guide pin consists of a tube made of an elastic material, said tube having slits extending through the thickness of the tube and, over at least part of its length, said slits being uniformly distributed along the periphery of said tube in order to form equidistant thin strips having an equal width, each of said thin strips exhibiting, over its length, at least one corrugation of which a convexity points towards the outside of said guide pin, said tube having a radius at the crest of said corrugation being greater than, or equal to, the radius of the bore when said brake motor is in a rest position.

2. The disc brake according to claim 1, wherein said first part of said guide pin is formed integrally with said second part of said guide pin and includes a second axial bore for allowing said guide pin to be secured to either said caliper or said fixed support.

3. The disc brake according to claim 2, wherein said first part of said guide pin is formed by folding over or crimping said tube which constitutes said second part of said guide pin.

4. The disc brake according to claim 3, wherein said first part of said guide pin includes a tubular metal insert in which said second axial bore is formed.

5. The disc brake according to claim 1, wherein said first part of said guide pin is attached to said second part of said guide pin.

6. The disc brake according to claim 1, further including an elastic body which is located inside said tube made from elastic material.

7. The disc brake according to claim 1, further including an elastic ring which surrounds said axial guide pin and is received in a groove formed in said first bore.

8. The disc brake according to claim 1, wherein a diametral clearance is left between said first bore and a cylindrical part of said guide pin.

* * * * *